May 24, 1932.  J. LUNDGREN  1,860,257
METHOD OF AND APPARATUS FOR BALANCING ROTATABLE BODIES
Filed July 30, 1927  4 Sheets-Sheet 2
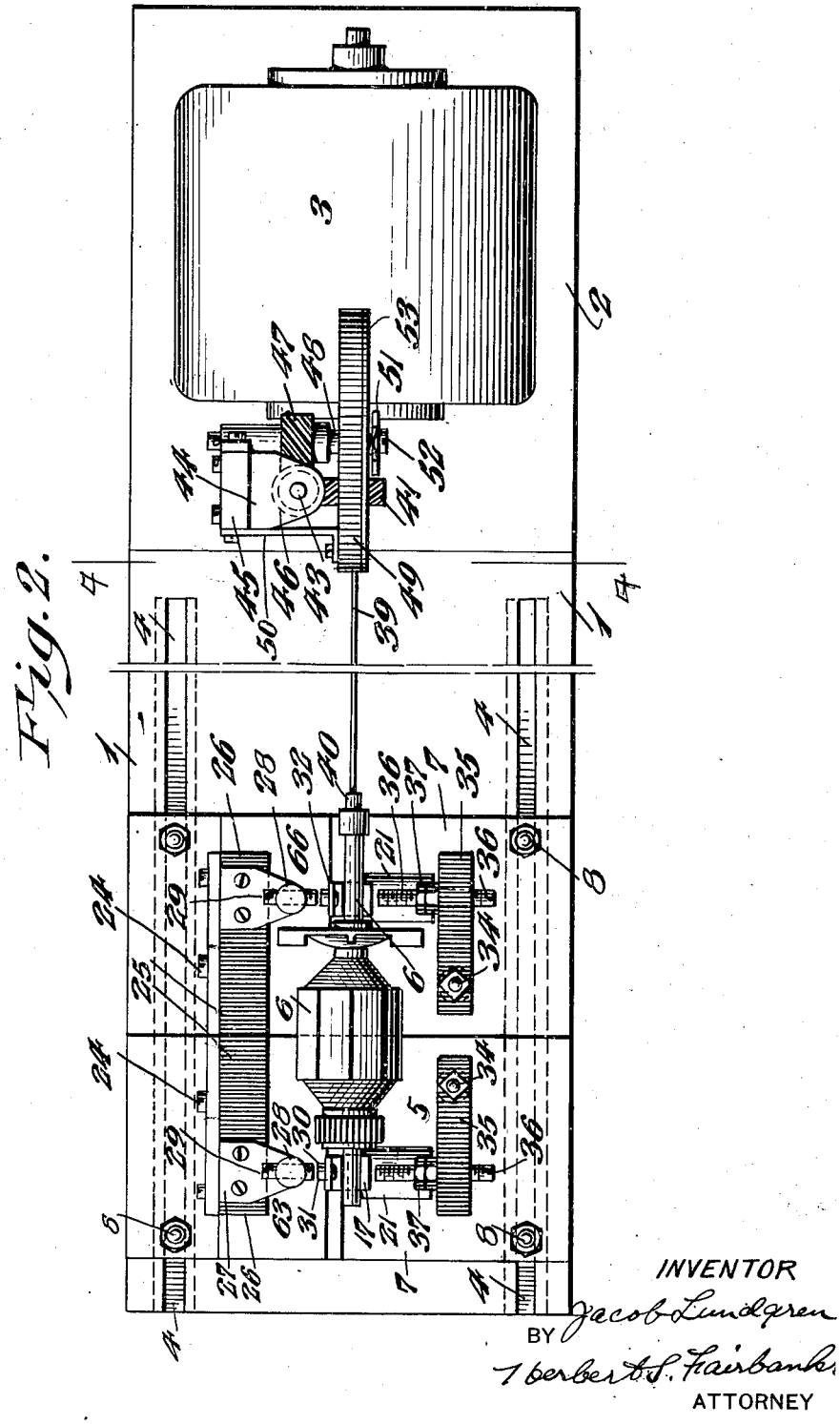

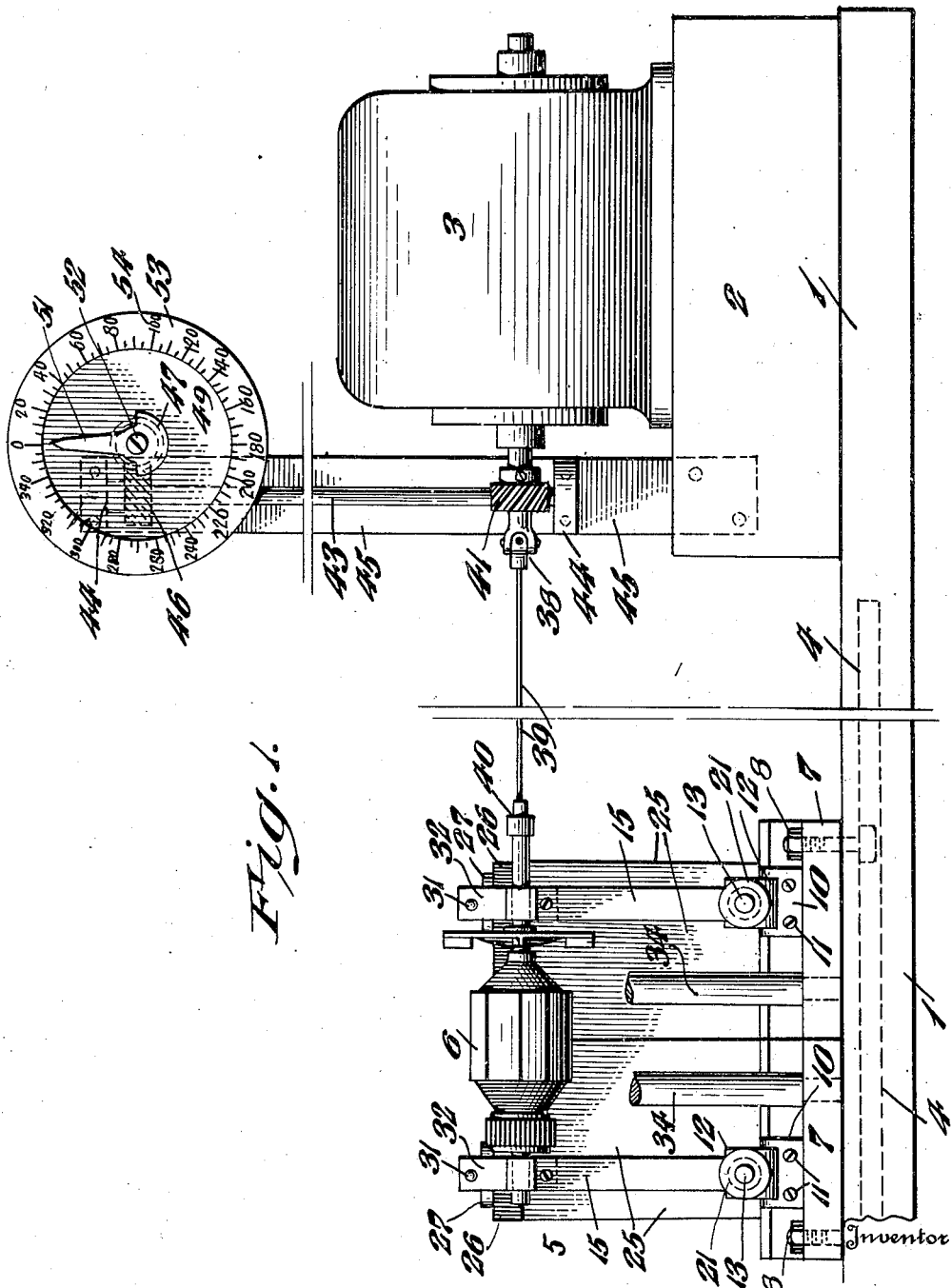

May 24, 1932.   J. LUNDGREN   1,860,257
METHOD OF AND APPARATUS FOR BALANCING ROTATABLE BODIES
Filed July 30, 1927   4 Sheets-Sheet 3
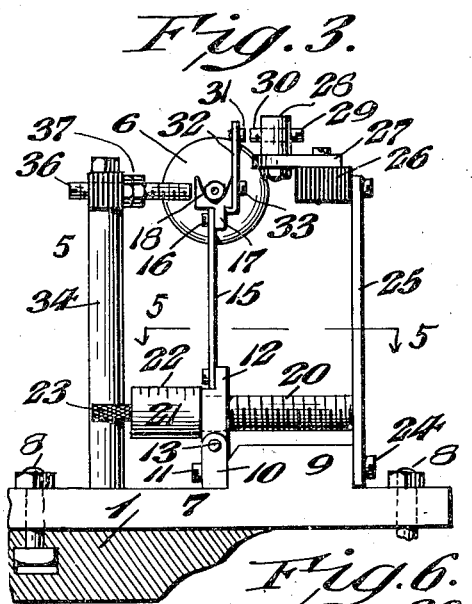
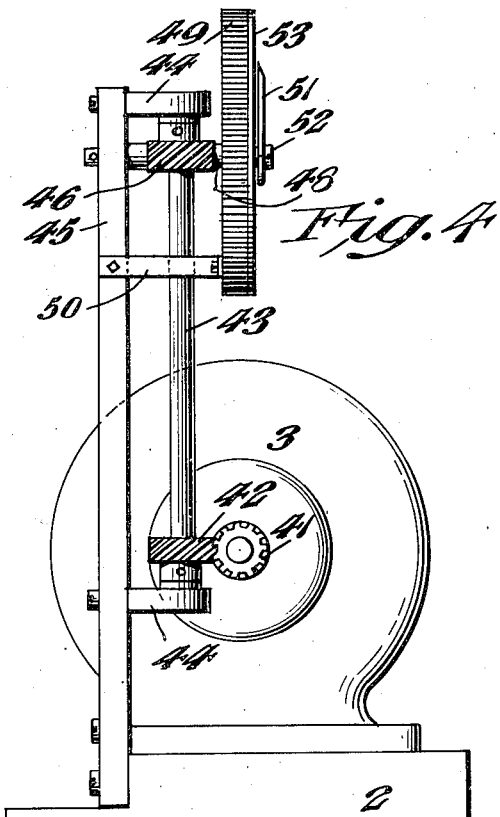
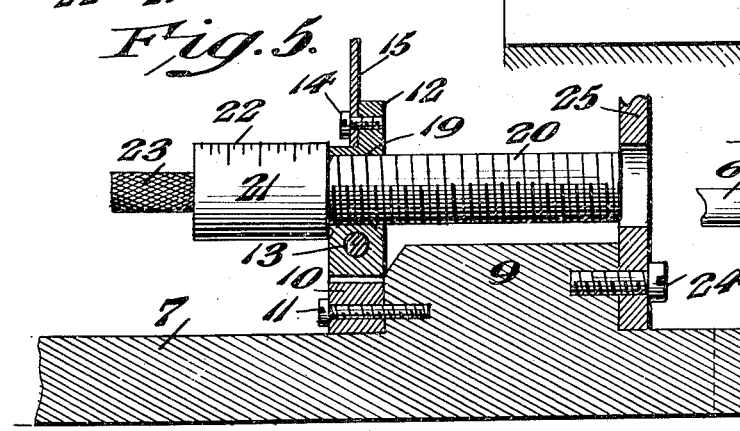
Inventor
Jacob Lundgren
By Herbert S. Fairbanks
Attorney Patented May 24, 1932

1,860,257

UNITED STATES PATENT OFFICE

JACOB LUNDGREN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA

METHOD OF AND APPARATUS FOR BALANCING ROTATABLE BODIES

Application filed July 30, 1927. Serial No. 209,492.

The primary object of this invention is to devise a novel method of and apparatus for balancing rotatable bodies.

One of the objects of my present invention is to devise a novel and simplified construction of a balancing machine wherein the lag, which has heretofore been present, due to mechanically moving parts, is eliminated in determining the angular direction or the plane of the unbalance of the specimen under test, and wherein an electrically controlled angle indicator is employed which is operative to locate and to visibly register the angle of unbalance in the specimen.

A further object of the invention is to devise a novel and simplified construction of a balancing machine wherein the unbalance can be simultaneously or independently determined at any axial planes.

A further object of the invention is to devise a balancing machine wherein a compensator can be provided for each axial plane in which the unbalance is to be determined, the compensators forming an integral part of the machine and being preferably carried by the specimen support.

A further object of the invention is to support the specimen on vibratory supports movable independent of each other, the movement of which under centrifugal action, due to unbalance in the specimen, is limited or restrained in one direction and is free to move in the opposite direction, and wherein electrically controlled means are provided to determine the extent of free movement of the specimen under centrifugal action in a determined axial plane.

A further object of the invention is to devise a novel angle indicator which is controlled by the movement in one direction of the vibratory bed which carries the specimen to be tested.

A further object of the invention is to devise a novel balancing machine wherein the operator can determine, at will, by the manual control of an electrical circuit, the character of unbalance which is present in the specimen, the axial plane or planes in which the unbalance is present, and also wherein compensating devices are present, which can be adjusted to compensate for the unbalance in the specimen at one or more axial planes.

A further object of the invention is to devise a novel angle indicator which is controlled by the movement in one direction of a vibratory support on which the specimen is mounted and which is effective to produce a spark or illuminate an indicator at an angle corresponding to the angle of unbalance in the specimen.

With the above and other objects in view as will hereinafter more clearly appear, my invention comprehends a novel method of and apparatus for balancing rotatable bodies.

It further comprehends a novel balancing machine in which electrically actuated means are present, controllable at the will of the operator to indicate either independently or simultaneously the unbalance which is present in the specimen at any predetermined axial plane or planes, and the angle and character of the unbalance which is present.

It further comprehends a novel balancing machine in which the specimen is driven by a flexible driving rod, and wherein the vibratory support for the specimen is provided with a compensator for each axial plane in which the unbalance is to be determined, and wherein the vibratory bed consists of a desired number of specimen supports adjustable relatively to each other in order to accommodate specimens of different dimensions.

Other novel features of construction and advantage will hereinafter more clearly appear in the detailed description and the appended claims.

For the purpose of illustrating the invention, I have shown in the accompanying drawings a typical embodiment of it, which, in practice, will give satisfactory and reliable results. It is however, to be understood that the various instrumentalities of which my invention consist can be variously arranged and organized, and my invention is not limited to the exact arrangement and organization of these instrumentalities, as herein set forth.

Figure 1 is a side elevation of a balancing machine embodying my invention.

Figure 2 is a top plan view thereof.

Figure 3 is an end view of a portion of the machine, a portion of the base being shown in section.

Figure 4 is a section on line 4—4 of Figure 2.

Figure 5 is a section on line 5—5 of Figure 3 on an enlarged scale.

Figure 6 is a top plan view of a portion of an angle indicator.

Figure 7 is a plan view partly in section of a coupling and its adjuncts.

Similar numerals of reference indicate corresponding parts.

Referring to the drawings:—

Figure 8:
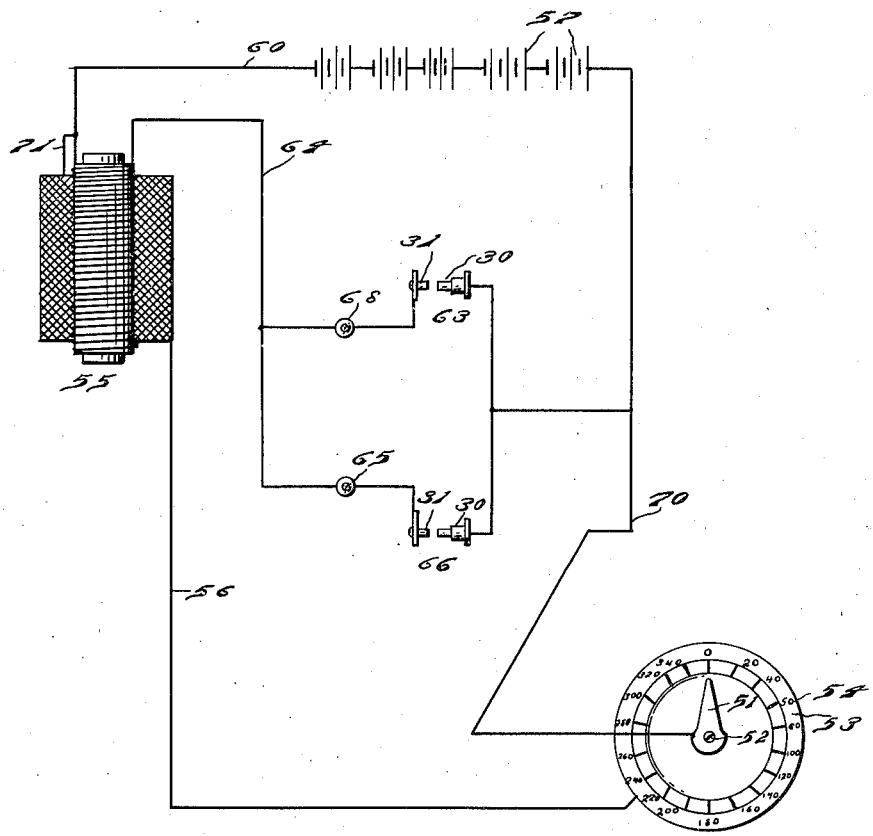
Figure 8 is a wiring diagram.

The machine is provided with a base or supporting foundation 1, which in practice may be of any desired character. As illustrated, it is in the form of a casting having at one end a raised portion 2 which forms a support for an electric motor 3 controlled in the usual or conventional manner.

The base 1 is provided with longitudinally extending keyways 4 in order that a specimen support 5 can be fixed thereon in the position to which it has been adjusted.

This specimen support 5 in some cases is in the form of a single unit but may consist of any desired number of sections, and for the purpose of illustration, I have shown it as consisting of two units which are capable of independent relative adjustment in order to adapt them to receive specimens 6 to be tested of many different dimensions.

*The specimen support*

Each unit of the specimen support 5 is provided with a base plate 7 which can be longitudinally adjusted on the base 1, and which is secured thereto by means of fastening devices 8 in the form of bolts and nuts, the heads of the bolts fitting into the keyways 4 of such base.

Each base plate 7 is provided with an upwardly extending portion 9, to which is connected a bracket 10 by means of fastening devices 11.

Each bracket 10 is bifurcated to receive a spring holder 12 which is pivoted to it by means of a pintle 13. The spring holder 12 has secured to it by means of fastening devices 14, one end of a spring 15 which has secured to it at its upper end by means of fastening devices 16, a bearing member 17, which has a recess 18 opening through its top face. The side walls of this recess 18 diverge outwardly and upwardly in order to adapt it to receive specimens of different diameters at the portions which rest on the bearing members.

Each spring holder 12 is provided with a threaded aperture 19 with the walls of which a compensator 20 in the form of a screw is in threaded engagement. Each compensator 20 is provided with an enlarged collar 21 having graduations 22 on its periphery, and the collar has connected with a knurled grasping handle 23.

The raised portion 9 of the base plate 7 has fixed to it, by means of fastening devices 24, a contact carrying plate 25 to the upper end of which a bar 26, of insulating material such as fibre or hard rubber, is connected.

Each bar 26 has secured to it a contact plate 27 to which a contact post 28 is secured in any desired manner. As illustrated, a contact post has its lower end portion of reduced diameter and threaded to receive a nut.

Each contact post 28 has a threaded opening to adjustably receive a contact screw 29, the free end of which carries a contact 30 adapted to cooperate with a contact 31 carried by a contact carrying plate 32 secured to its respective bearing 17 by fastening devices 33.

Each base plate 7 has rising from it one or more studs 34, each of which at its upper end is connected with its respective cross bar 35 which is provided with a laterally adjustable stop 36, in the form, as illustrated, of a screw in threaded engagement with the bar. The free end of each stop 36 is in the vibratory path of its respective bearing 17 to limit or restrain the movement in one direction of such bearing and its spring 15. Each stop is secured in its adjusted position by nuts 37, one of which serves as a lock nut.

It will now be apparent that I provide a vibratory bed or support for the specimen to be tested and this bed under centrifugal action on unbalanced portions of the specimen is free to vibrate in one direction, and is restrained or prevented from vibration in the opposite direction.

*Means for revolving the specimen*

The motor 3 has its driving shaft provided with a universal coupling 38 of any desired or conventional type, and this coupling is connected with a flexible driving rod 39 which is connected by means of a driving coupling 40 with the end of the shaft of the specimen, or with a member connected to the specimen. As illustrated, the coupling is in threaded engagement with the shaft so that the specimen will be revolved in unison with and at the same speed as the revolution of the shaft of the motor 3.

*Angle indicating mechanism*

The shaft of the motor 3 is provided with a gear 41 which meshes with a gear 42, mounted on a shaft 43, journalled in brackets 44, carried by a standard 45 which is fixed at its lower end to the motor support 2.

The shaft 43 is provided at its upper end with a gear 46 which meshes with a gear 47, fixed to a shaft 48, journalled in the standard 45 and passing through a disc 49 of insulating material. This disc is fixed to the standard 45 by means of a dial bracket 50, see Figure 4.

The shaft 48 is provided with a dial hand 51, secured thereto by means of a hand screw 52. This dial hand revolves in unison with the dial shaft 48 and its free end travels in proximity to the inner periphery of a dial 53 which is of conducting material, and which is in the form of a ring having graduations 54. The dial is fixed to the disc 49, and with the dial hand 51 forms an angle indicator.

Referring now more particularly to the wiring diagram seen in Figure 8, 55 designates a spark coil, the secondary of which is electrically connected with the dial 53.

57 designates a source of electric current one lead 60 of which is connected with the primary of the spark coil 55 and also through the line 71 with the secondary of said coil. The source of electric supply 57 is connected by the line 70 with the dial hand 51. The secondary of the spark coil is connected by line 56 with the dial 53. The primary has leading from it a line 64 which is provided with a switch 68 and leads to the contact 31 which cooperates with the contact 30 of the circuit opening and closing device 63 at one end of the specimen support, the contact 30 being electrically connected with the line 70. In a similar manner the line 64 leading from the primary of the spark coil is connected with the contact 31 of the automatic circuit opening and closing device 66 at the opposite end of the specimen support and is provided with a manually actuated switch 65. The contact 31 of the circuit opening and closing device 66 cooperates with its contact 30 which is connected with the line 70.

The operation of my novel method of and apparatus for balancing rotatable bodies will now be apparent to those skilled in this art and is as follows:

The specimen 6 to be balanced is placed on the bearings 17 and is connected by means of the coupling member 40 with the specimen or a member attached to it.

As shown in Figure 7, the flexible driving rod 39 is fixed to the coupling member 40, and the latter is in threaded engagement with the shaft of the specimen 6. The stops 36 are adjusted to restrain or limit the movement in one direction of the bearings 17, it being apparent that these bearings are free to move in the opposite direction due to centrifugal action on the unbalanced forces in the specimen.

The compensators 20 are adjusted to their neutral position, and as shown in Figure 5, they do not at any time contact with the supporting plates 25, and as shown these plates are apertured to prevent the inner ends of the compensators from contacting therewith.

The motor is now started into operation to cause the specimen to revolve at any desired speed. The unbalance in the specimen will cause the specimen and the bearings to move laterally in the direction of their free movement so that one or both of the contacts 31 will engage the contacts 30 so that if the operator presses either the push button 65 or the push button 68, or both of these push buttons, the electrical circuit will be closed and a spark will be created between the dial hand 51 and the dial 53, due to the closing and breaking of the primary circuit at contact points 29 and 30 for instance, due to vibrations caused by unbalance in the test piece, so that the operator can, at a glance, read the degree at which the spark is effective and thus determine the angle of unbalance in the specimen for one or more axial planes, and this determination can be made either independently or simultaneously. If only one spark is produced, when the push buttons are simultaneously actuated, the operator knows that the angle of unbalance is the same for the two different axial planes. This seldom takes place in commercial balancing of specimens and in the great majority of cases two separate spaced sparks are produced each of which indicates the angle of unbalance of the axial plane of which it is indicative.

As illustrated, the unbalance is determined in two axial planes, and if the sparks are in the same angular plane then the operator will know that only static unbalance is present, while if a spark is produced for both axial planes at different angles, then the operator will know that dynamic unbalance is present in the specimen or a combination of static and dynamic.

Assuming now that the operator has ascertained the angle of unbalance for one axial plane, he adjusts the compensator 20 to cause it to move to the left of the position seen in Figure 5 until the vibration of its bearing 17 disappears which is indicated by disappearance of the spark. The collars 22 are of known weight, such as for example, a determined number of ounces, so that the operator can determine in ounce inches the amount of the unbalance and its linear location.

The same cycle of operation is now carried out with respect to the other axial plane, the angle being first found in the same way as before explained, and the amount and the linear location of the unbalance is determined by the adjustment of the compensator provided for such axial plane.

For the purpose of illustration, I have shown only two units of the specimen support, but any desired number can be employed and be within the scope of this invention, as will be understood by reference to the Olsen and Lundgren Patent Number 1,595,724, August 10, 1926.

In accordance with my present invention, the unbalance as to amount, linear location, and angle, can be accurately determined without removing the specimen from its support, or without turning it around on the specimen support.

The bearings and their yielding mountings form a vibratory specimen support, the movement of which in one direction is restrained or limited, while it has free movement in the opposite direction so that in effect I utilize the pressure of unbalanced forces in the specimen under centrifugal action to determine the angle of unbalance of such unbalanced forces in the specimen.

Figure 9:
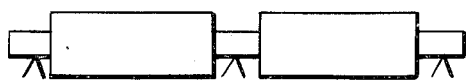
Figure 9 represents diagrammatically, the manner in which a specimen is supported by a plurality of vibratory supports.

From the diagrammatic view shown in Figure 9, it will be apparent that one may employ any number of bearing supports so that the pressure in one direction under centrifugal action can be measured and determined in a plurality of axial planes of the specimen.

In this manner one is able to determine not only the angle of unbalance but also the difference of pressure exerted in one direction at a plurality of points and also the difference of pressure exerted at one point during different angular positions of the specimen.

It will now be apparent that I have devised a new and useful method of and apparatus for balancing rotatable bodies which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In a balancing machine, a vibratory bed for the specimen to be tested, consisting of a plurality of independent vibratory units, means to restrain the movement of each unit in one direction, said units being free to move in the opposite direction, and a compensator carried by each unit to compensate under centrifugal action on the specimen for unbalance in the axial plane of the specimen controlled by each unit.

2. In a balancing machine, a vibratory support for the specimens to be tested, means controlled by the movement of said support in one direction only to visibly indicate on said angle indicator the angle of unbalance of said specimen and means to drive said specimen and means at a predetermined relative speed.

3. In a balancing machine, a vibratory support for the specimen to be tested, free to move in one direction, means to restrain the movement of said support in the opposite direction, means to revolve a specimen on said support, an angle indicator having a dial and a revoluble hand, means to drive said hand at the same speed as that of said specimen, and means controlled by the free movement of said support and effective at the will of the operator to close the electric circuit, and cause a spark to travel between the dial hand and dial at the angle corresponding to the angle of unbalance of the specimen.

4. In a balancing machine, a base, a support for the specimen to be tested adjustably mounted on said base, brackets pivoted to said base, springs connected at one end of said brackets, bearings secured to the opposite ends of said springs, adjustable means to limit the movement of said bearings in one direction, weights carried by said brackets and laterally adjustable with respect thereto, an angle indicator having a graduated dial and a revoluble dial hand, means to drive said dial hand at the same speed as that of said specimen, said bearings being free to move in one direction, and means controlled by such free movement to visibly indicate the position of the dial hand with respect to the dial which corresponds to the angle of unbalance in the specimen.

5. In a balancing machine for determining the unbalance of rotatable specimens, an angle indicator including a dial and a dial hand, means to revolve said dial hand at a predetermined relative speed with respect to the specimen under test, and means controlled by the movement of the specimen in one direction under centrifugal action due to unbalance in the specimen to cause an electrical spark to pass between said dial hand and dial at a point indicative of the angle of unbalance in the specimen.

6. In a balancing machine, the combination of bearings for rotatably supporting a specimen to be tested, means to restrain the movement of support in one direction, said support being free to move in a plane transverse to the specimen, means acting at one side only of the specimen for measuring the lateral pressure of the specimen under centrifugal action on said bearings, and means operable at the will of the operator and revoluble at a predetermined relative speed with respect to the specimen to indicate the angle of unbalance of the specimen.

7. In a balancing machine, a vibratory support for the specimen to be tested, an angle indicator, means to drive said specimen and angle indicator at a pretermined relative speed, and an electric circuit including circuit opening and closing mechanism and controlled by the vibratory movement of said support to indicate on said angle indicator the angle of unbalance of the specimen.

8. In a balancing machine, a support for the specimen to be tested, an angle indicator, means to drive said specimen and angle indicator at a predetermined relative speed, and an electric circuit including circuit opening and closing mechanism controlled by the vibratory movement of said support and effective at the will of the operator to produce a spark to indicate on said angle indicator the angle of unbalance of the specimen in a predetermined axial plane.

9. In a balancing machine, a support for the specimen to be tested, an angle indicator, means to drive said specimen and angle indicator at a predetermined relative speed, and an electric circuit having circuit opening and closing mechanism controlled by the vibratory movement of said support and effective at the will of the operator to indicate on said angle indicator the angle of unbalance of the specimen in a plurality of axial planes of such specimen.

10. In a balancing machine, a vibratory support for the specimen to be tested, an electric circuit including circuit opening and closing mechanism controlled by the vibratory movement of said support to simultaneously indicate the angle of unbalance in a plurality of axial planes of the specimen, and means to drive said specimen and means at a predetermined relative speed.

11. In a balancing machine, a vibratory support for the specimen to be tested, means controlled by said support and effective at the will of the operator to independently indicate the angle of unbalance of the specimen in different axial planes, and means to drive said specimen and means at a predetermined relative speed.

12. In a balancing machine, a vibratory support for the specimen to be tested, means to restrain said support in its movement in one direction and permit it to move in the opposite direction, means controlled by the free movement of said vibratory support to indicate the angle of unbalance of the specimen, and means to drive said specimen and said means at a predetermined relative speed.

13. In a balancing machine, a vibratory support for the specimen to be tested, means to limit the movement of said support in one direction, said support being free to move in the opposite direction due to centrifugal action on the unbalanced part of the specimen, means controlled by said support to indicate the unbalance of the specimen, means to drive said specimen and said means at a predetermined relative speed, and means to indicate the weight and the location of the unbalance.

14. In a balancing machine, a vibratory support for the specimen to be tested, comprising a plurality of vibratory units, means to limit the movement of said units in one direction, said units being free to move in the opposite direction due to centrifugal action on unbalanced portions of the specimen in determined axial planes, compensating means carried by each unit to compensate for and neutralize the unbalance in the axial planes determined by such units, angle indicating means, and means to drive the specimen and the angle indicating means at a predetermined relative speed.

15. In a balancing machine, a vibratory support for the specimen to be tested comprising a plurality of vibratory units, means to limit the movement of said units in one direction, said units being free to move in the opposite direction due to centrifugal action on unbalanced portions of the specimen in determined axial planes, compensating means carried by each unit to compensate for and neutralize the unbalance in the axial plane determined by such unit, means controlled by the free movement of each unit to visibly register the angle of unbalance in the axial plane of the specimen determined by such unit, and means to drive said specimen and said means at a predetermined relative speed.

16. In a balancing machine, a vibratory support for the specimen to be tested, comprising a plurality of relatively adjustable vibratory units, means to limit the vibratory movement of said units in one direction, said units being free to move in the opposite direction under centrifugal action on unbalanced parts of the specimen, electrical circuit controlling devices controlled by the free movement of said units to indicate the angle of unbalance in axial planes of the specimen, means to drive said specimen and devices at a predetermined relative speed, and circuit closing devices corresponding in number to the number of axial planes in which the unbalance of the specimen is to be determined, and operable at the will of the operator.

17. In a balancing machine, a plurality of bearings yieldingly mounted and serving as a support for the specimen to be tested, each of said bearings being free to move in one direction, adjustable means to limit the movement of said bearings in the opposite direction, angle indicating mechanism, an electric circuit having circuit opening and closing mechanism controllable by each of said bearings, and means to revolve said specimen on said bearings and drive said mechanism at a predetermined relative speed.

18. In a balancing machine, a plurality of bearings yieldingly mounted and serving as a support for the specimen to be tested, each of said bearings being free to move in one direction, adjustable means to limit the movement of said bearings in the opposite direction, means to revolve said specimen on said bearings, angle indicating mechanism electrically controllable by each of said bearings, means to revolve the specimen on said bearings and to drive said mechanism at a predetermined relative speed, and a weight carried by each yielding mounting and adjustable to compensate for unbalance in a determined axial plane.

19. In a balancing machine, a plurality of bearings pivotally supported and having yielding connections between the pivots and the bearings, adjustable stop devices to limit the movement of the bearings in one direction, said bearings being free to move in the opposite direction, an angle indicator, means to drive the specimen and angle indicator at a predetermined relative speed, and an electrical circuit to actuate said angle indicator and including contacts carried by said bearings to render said circuit operative.

20. In a balancing machine, a base, vibratory supports relatively adjustable on said base to accommodate specimens of different dimensions, means to lock said supports in their adjusted position, and an electric circuit having circuit opening and closing mechanism controlled by the vibratory movement of each support to visibly indicate the angle of unbalance of the specimen in the plane of the specimen of which it is indicative, and means to revolve a specimen on said supports and said electrically actuated means at a predetermined relative speed.

JACOB LUNDGREN.